United States Patent
Sahin et al.

(10) Patent No.: US 12,091,234 B2
(45) Date of Patent: Sep. 17, 2024

(54) ALUMINUM-FREE CORNET CONE PACKAGE

(71) Applicant: Mondi Kale Nobel Ambalaj Sanayi Ve Ticaret Anonim Sirketi, Kirklareli (TR)

(72) Inventors: Umit Sahin, Kirklareli (TR); Ayse Engin, Kirklareli (TR)

(*) Notice: Subject to any disclaimer, the term of this patent is extended or adjusted under 35 U.S.C. 154(b) by 116 days.

(21) Appl. No.: 17/776,516

(22) PCT Filed: Jun. 29, 2021

(86) PCT No.: PCT/TR2021/050668
§ 371 (c)(1),
(2) Date: May 12, 2022

(87) PCT Pub. No.: WO2022/146302
PCT Pub. Date: Jul. 7, 2022

(65) Prior Publication Data
US 2023/0150755 A1 May 18, 2023

(30) Foreign Application Priority Data
Dec. 29, 2020 (TR) .................. 2020/22322

(51) Int. Cl.
| B65D 85/78 | (2006.01) |
| B65D 65/42 | (2006.01) |
| D21H 19/84 | (2006.01) |
| D21H 27/10 | (2006.01) |

(52) U.S. Cl.
CPC .......... B65D 85/78 (2013.01); B65D 65/42 (2013.01); D21H 19/84 (2013.01); D21H 27/10 (2013.01); *B65D 2565/385* (2013.01)

(58) Field of Classification Search
CPC .. B65D 85/78; B65D 65/42; B65D 2565/385; B65D 85/75; D21H 19/84; D21H 27/10
USPC .................................................. 229/87.08
See application file for complete search history.

(56) References Cited

U.S. PATENT DOCUMENTS

| 5,021,298 A * | 6/1991 | Revell ................... B65D 65/42 |
| | | 428/458 |
| 2007/0232743 A1* | 10/2007 | Laviolette .............. D21H 19/42 |
| | | 524/451 |
| 2021/0025114 A1* | 1/2021 | Mongrain .............. D21H 19/20 |
| 2021/0246329 A1* | 8/2021 | Yoon ...................... D21H 17/37 |

FOREIGN PATENT DOCUMENTS

| CN | 105926368 A | 9/2016 |
| EP | 0098368 B1 * | 10/1986 |
| EP | 2266894 B1 | 12/2012 |
| GB | 732434 A | 6/1955 |
| KR | 20090008028 A | 1/2009 |

(Continued)

OTHER PUBLICATIONS

International Search Report for corresponding PCT/TR2021/050668, dated Dec. 13, 2021.

(Continued)

*Primary Examiner* — Jes F Pascua
(74) *Attorney, Agent, or Firm* — Egbert, McDaniel & Swartz, PLLC

(57) ABSTRACT

A recyclable and environmentally friendly cornet cone package which does not contain an aluminum layer and only contains a paper layer.

2 Claims, 1 Drawing Sheet

(56) References Cited

FOREIGN PATENT DOCUMENTS

| TR | 2017/00278 A | 7/2018 | |
| TR | 2018/13006 A | 9/2018 | |
| WO | 2011061473 A1 | 5/2011 | |
| WO | WO-2013075918 A1 * | 5/2013 | ............. D21H 19/40 |
| WO | WO-2019094805 A1 * | 5/2019 | ........... C09D 133/12 |

OTHER PUBLICATIONS

Written Opinion of the International Searching Authority for corresponding PCT/TR2021/050668, dated Dec. 13, 2021.

* cited by examiner

ALUMINUM-FREE CORNET CONE PACKAGE

TECHNICAL FIELD

The invention relates to a recyclable and environmentally friendly cornet cone package since it does not contain an aluminum layer and contains only a paper layer.

PRIOR ART

Today, cornet cone packages are used to present ice creams to consumers. The packages of ice creams, which are currently called cornet, contain an aluminum layer. The aluminum in the package prevents the package from being a recyclable product and creates a negative situation for the environment.

In addition, due to the aluminum contained in the composite structure, which consists of different thicknesses as Al/Paper in both layers according to the current spectrum, existing products cannot meet the regulations in a recyclable and sustainable manner.

A patent similar to the product subject to the invention was not encountered in the patent research. However, references are made below to some patents made in the similar technical field.

European Patent publication number EP2266894B1 relates to packaging for cornet ice creams. A blank is provided to form a cone packaging suitable for packaging cone ice cream products; the blank has an at least partially curved upper edge, two side edges and at least one circumferential line of weakness located at a distance of 1 mm to 30 mm from and generally parallel to the upper edge of the blank; characterized in that it has a plurality of non-circumferential lines of weakness between at least one circumferential weakness line and the upper edge.

Another patent application numbered TR2017/00278 belonging to the applicant company relates to a windowed cornet package in which all kinds of ice cream prepared from dried and fresh fruits are placed according to the consumer's preference and it includes a window on the said cornet package and a transparent barrier in connection with the said window.

Another patent application numbered TR2018/13006, which belongs to the applicant company, is related to the cone-shaped, easily-teared cornet packaging used in the packaging of cone-shaped cornet-type ice creams. Feature of the invention; is the easy separation of the cornet package from the ice cream cone by tearing the upper tear line and the lower tear line in the concave form in a correct and wide area after the holding protrusion between the upper curve and the lower curve formed in an inward form on the outer edge line forming the opening section.

As a result, due to the aluminum content of the existing cornet cone packages, the existence of problems and the insufficiency of existing solutions made it necessary to make an improvement in the related technical field.

OBJECT OF THE INVENTION

Based on the state of the art, the main object of the invention is, to develop a recyclable and environmentally friendly cornet cone package, as it does not contain an aluminum layer and contains only a paper layer.

Another object of the invention is to produce three or four layers of the package according to the invention and obtaining the package with three different layer contents, while the number of layers forming the package is six in the prior art and all layer contents are made up of different materials.

Another object of the invention is to develop an environmentally friendly product thanks to the fact that the cornet cone package does not contain aluminum, and also to obtain a package structure that can meet the regulations in a recyclable and sustainable way in accordance with the current specifications.

REFERENCE NUMBERS FOR THE PRIOR ART

1. Cornet cone package
   1.1. Food type lac layer
   1.2. Print layer
   1.3. Primer lac layer
   1.4. Aluminum layer
   1.5. Adhesive layer
   1.6. Paper layer

REFERENCE NUMBERS OF THE INVENTION

2. Cornet cone package
   2.1. Water-based barrier lac layer
   2.2. Print layer
   2.3. Paper layer

DETAILED DESCRIPTION OF THE INVENTION

The invention relates to a recyclable and environmentally friendly cornet cone package (2) since it does not contain an aluminum layer and contains only a paper layer.

Figure 1:
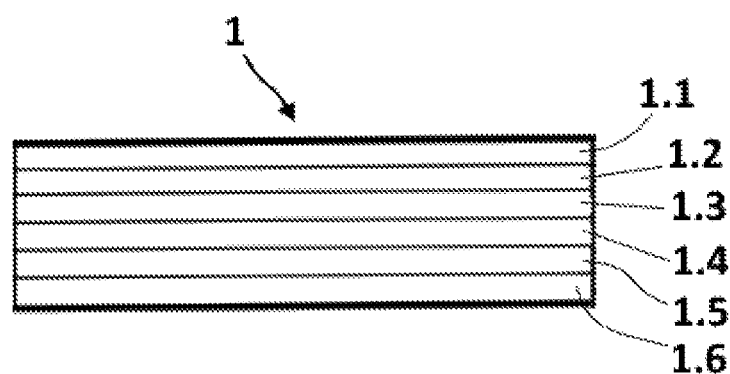
FIG. 1, is a representative sectional view showing layers of the prior art cornet cone package.

In FIG. 1, a representative section view showing the layers of the cornet cone package (1) belonging to the prior art is given. Presently used cornet cone packages (1) consists of food type lac layer (1.1), print layer (1.2), primary lac layer (1.3), aluminum layer (1.4), adhesive layer (1.5) and paper layer (1.6) from outside to inside.

The aluminum in the package prevents the package from being a recyclable product and creates a negative situation for the environment.

In addition, due to the aluminum contained in the composite structure, which consists of different thicknesses as Al/Paper in both layers according to the current spectrum, existing products cannot meet the recyclable regulations in a sustainable manner.

Figure 2:
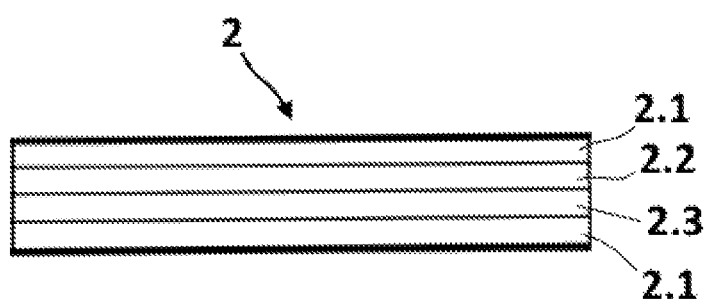
FIG. 2, is a representative cross-sectional view showing the cone packaging layers of the invention.

In FIG. 2, a representative section view showing the layers of the cornet cone package (2) of the invention is given.

The cornet cone package (2) of the invention contains a water-based barrier lac layer (2.1), a print layer (2.2), a paper layer (2.3) that can be in different weights, and a water-based barrier lac layer (2.1) from the outside to the inside.

During the production of the package according to the invention, a water-based barrier lac layer (2.1) is preferably applied to the side of the print layer (2.2) on the paper layer (2.3) in the range of 70-120 gsm and further that during the production of the package according to the invention, a water-based barrier lac layer (2.1) in the range of 2-5 gsm is applied to the inner surface in contact with the product along with the print layer (2.2) side.

Thanks to the invention; since it does not contain an aluminum layer and contains only a paper layer, it has been turned into a recyclable and environmentally friendly product. In addition, a packaging structure that can meet the regulations in a recyclable and sustainable way in accordance with the current specifications was obtained.

The invention claimed is:

1. An article for containing an ice cream product, the article comprising:
    a cornet cone package entirely free of aluminum, said cornet cone package having a first water-based lac layer, a paper layer applied to a surface of the first water-based lac layer, a print layer applied to a surface of the paper layer opposite to the first water-based lac layer and a second water-based lac layer applied to a surface of the print layer opposite the surface of the paper layer.

2. The article of claim 1, wherein the second water-based lac layer has a density of between 70 and 120 grams per square meter, the first water-based lac layer having a density of between 2 and 5 grams per square meter.

* * * * *